United States Patent
Yamamoto et al.

(10) Patent No.: US 7,003,867 B2
(45) Date of Patent: Feb. 28, 2006

(54) METHOD FOR WINDING COILS ON ROTOR CORE

(75) Inventors: Toshio Yamamoto, Kosai (JP); Atsuo Okamoto, Toyohashi (JP); Takerou Totsuka, Kosai (JP); Akiyoshi Katou, Kosai (JP)

(73) Assignee: Asmo Co., Ltd., Shizuoka-ken (JP)

( * ) Notice: Subject to any disclaimer, the term of this patent is extended or adjusted under 35 U.S.C. 154(b) by 117 days.

(21) Appl. No.: 10/687,559

(22) Filed: Oct. 15, 2003

(65) Prior Publication Data

US 2004/0124737 A1 Jul. 1, 2004

(30) Foreign Application Priority Data

Oct. 18, 2002 (JP) .......................................... 2002-304670
Jan. 23, 2003 (JP) .......................................... 2003-014907

(51) Int. Cl.
*H02K 15/02* (2006.01)
*H02K 15/10* (2006.01)

(52) U.S. Cl. ............................. 29/598; 29/56.5; 29/596; 29/597; 29/605; 29/735; 242/361.1; 242/362.2; 242/363; 242/433.3; 310/219; 310/234

(58) Field of Classification Search .................. 29/598, 29/56.5, 596, 597, 605, 735; 242/361.1, 362.2, 242/363, 433.3; 310/218, 234
See application file for complete search history.

(56) References Cited

U.S. PATENT DOCUMENTS

| 3,980,243 A | * | 9/1976 | Schulman ................ 242/433.3 |
| 5,100,071 A | * | 3/1992 | Hongo et al. ............ 242/433.3 |
| 6,532,645 B1 | * | 3/2003 | Becherucci et al. .......... 29/596 |
| 2004/0113511 A1 | * | 6/2004 | Schmidt et al. ............. 310/218 |

FOREIGN PATENT DOCUMENTS

JP 09-019095 1/1997

* cited by examiner

*Primary Examiner*—Carl J. Arbes
*Assistant Examiner*—Tim Phan
(74) *Attorney, Agent, or Firm*—Sheridan Ross P.C.

(57) ABSTRACT

A core includes a ring body and a plurality of teeth. The teeth extend radially outward form the outer circumference of the ring body. The core is formed by assembling a first core member and a second core member. Each core member has part of the teeth the number of which is half the total number of the teeth. Each tooth includes a tooth body about which the coil is wound, and a magnetism converging portion provided at the distal end of the tooth body. The tooth height of each tooth body gradually increases from a distal section to a proximal section of the tooth body. The tooth width gradually decreases from the distal section to the proximal section. The wire is wound about each of the teeth of the first and second core members. Then, the first and second core members are assembled to form the core. Accordingly, a rotor core having a high coil accommodation efficiency and a high coil space factor is obtained.

7 Claims, 9 Drawing Sheets

METHOD FOR WINDING COILS ON ROTOR CORE

CROSS REFERENCE TO RELATED APPLICATIONS

This application claims priority to Japanese Patent Applications No. 2002-304670, filed Oct. 18, 2002 and 2003-014907, filed Jan. 23, 2003.

BACKGROUND OF THE INVENTION

The present invention relates to a rotor core, a direct-current motor, and a method for winding coils on a rotor core.

Recently, to meet demands for compact and high performance motors, motor cores having an increased coil density and an improved accommodation efficiency are wanted. A rotor core of a direct-current motor has radially extending teeth. A coil is wound about each tooth. A slot between each adjacent pair of teeth, or an accommodation space for a coil, narrows toward the radially inner end and widens toward the radially outer end.

Thus, when winding a coil about each tooth in a concentrated manner, the number of times the coil is wound increases toward the radially outer end. Thus, the measurement of the wound coil along the axial direction of the motor, or the coil height, increases toward the outer end of the teeth, which increases the axial size of the motor.

Japanese Laid-Open Patent Publication No. 9-19095 discloses a rotor core having teeth, in which core the circumferential width of each tooth increases toward the radially outer end, and the height (the measurement along the axial direction of the motor) of each tooth decreases toward the radially outer end. This configuration reduces the coil height at the radially outer sections of the teeth and reduces the size of the motor.

However, in the configuration disclosed in the above publication, the space between the distal sections of each adjacent pair of the teeth widens toward the radially outer end, and each coil is wound about the corresponding tooth using those spaces. Therefore, the space factor of the coils is limited. The distal section of each tooth faces one of magnets provided on a stator. Magnetism converges on the distal section of each tooth. Since the thickness (height) of the distal section, or the magnetism converging section, of each tooth is small, the necessary magnetic flux does not flow through the teeth. This lowers the motor torque.

SUMMARY OF THE INVENTION

Accordingly, it is an objective of the present invention to provide a rotor core, a direct-current motor, and a method for winding coils on a rotor core that improve the accommodation efficiency and the space factor of coils.

To achieve the above objective, the present invention provides a rotor core. The rotor core includes a ring body and a plurality of teeth extending radially outward from an outer circumference of the ring body. Each tooth includes a coil winding portion about which a coil is wound. The coil winding portion includes a proximal section and a distal section. The proximal section is coupled to the ring body. The distal section is located radially outward of the proximal section A magnetism converging portion is provided at the distal section of the coil winding portion. The measurement of each coil winding portion with respect to the axial direction of the rotor core gradually increases from the distal section to the proximal section. The measurement of each coil winding portion with respect to the circumferential direction of the rotor core gradually decreases from the distal section to the proximal section. The rotor core includes a plurality of assembled core members. Each core member has part of the teeth the number of which obtained by dividing the total number of the teeth of the rotor core by the number of the core members. The teeth of each core member are spaced at equal angular intervals.

According to another aspect of the invention, a rotor core that includes a ring body and a plurality of teeth is provided. The teeth extend radially outward from an outer circumference of the ring body. Each tooth includes a coil winding portion about which a coil is wound. The coil winding portion includes a proximal section and a distal section. The proximal section is coupled to the ring body. The distal section is located radially outward of the proximal section A magnetism converging portion is provided at the distal section of the coil winding portion. The rotor core includes a plurality of assembled core members. Each core member has part of the teeth the number of which obtained by dividing the total number of the teeth of the rotor core by the number of the core members. The teeth of each core member are spaced at equal angular intervals. In each core member prior to assembly, the magnetism converging section does not exist in a range between the proximal section and the distal section of each coil winding portion with respect to a direction perpendicular to the extending direction of the coil winding portion.

In addition, present invention may be applicable to provide a method for winding coils on a rotor core. The rotor core includes a ring body and a plurality of teeth extending radially outward from an outer circumference of the ring body. Each tooth includes a coil winding portion about which a coils is wound. The coil winding portion includes a proximal section and a distal section. The proximal section is coupled to the ring body. The distal section is located radially outward of the proximal section. A magnetism converging section is provided at the distal section of the coil winding portion. The rotor core includes a plurality of core members assembled to form the rotor core. Each core member has part of the teeth the number of which obtained by dividing the total number of the teeth of the rotor core by the number of the core members. The teeth of each core member are spaced at equal angular intervals. The winding method includes steps of: holding with a jig one of the core members prior to assembly at at least one of the teeth of the, core member; and rotating the core member held by the jig about a rotation axis along the extending direction of at least one of the teeth, thereby winding the wire forming the coil about the one tooth.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be described with reference to FIGS. 1 to 6.

Figure 1:
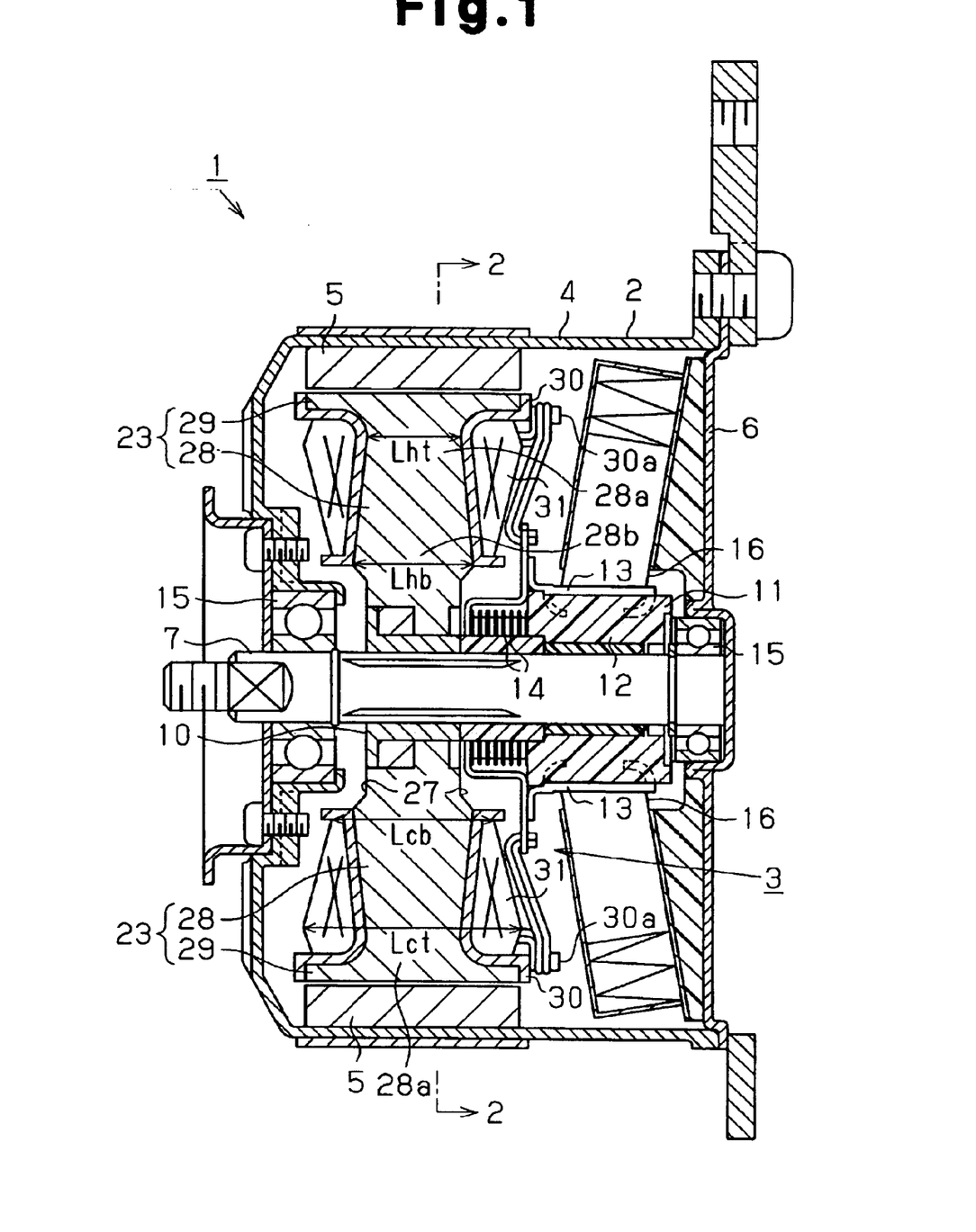
FIG. 1 is a side cross-sectional view illustrating a direct-current motor according to one embodiment of the present invention.
Figure 2:
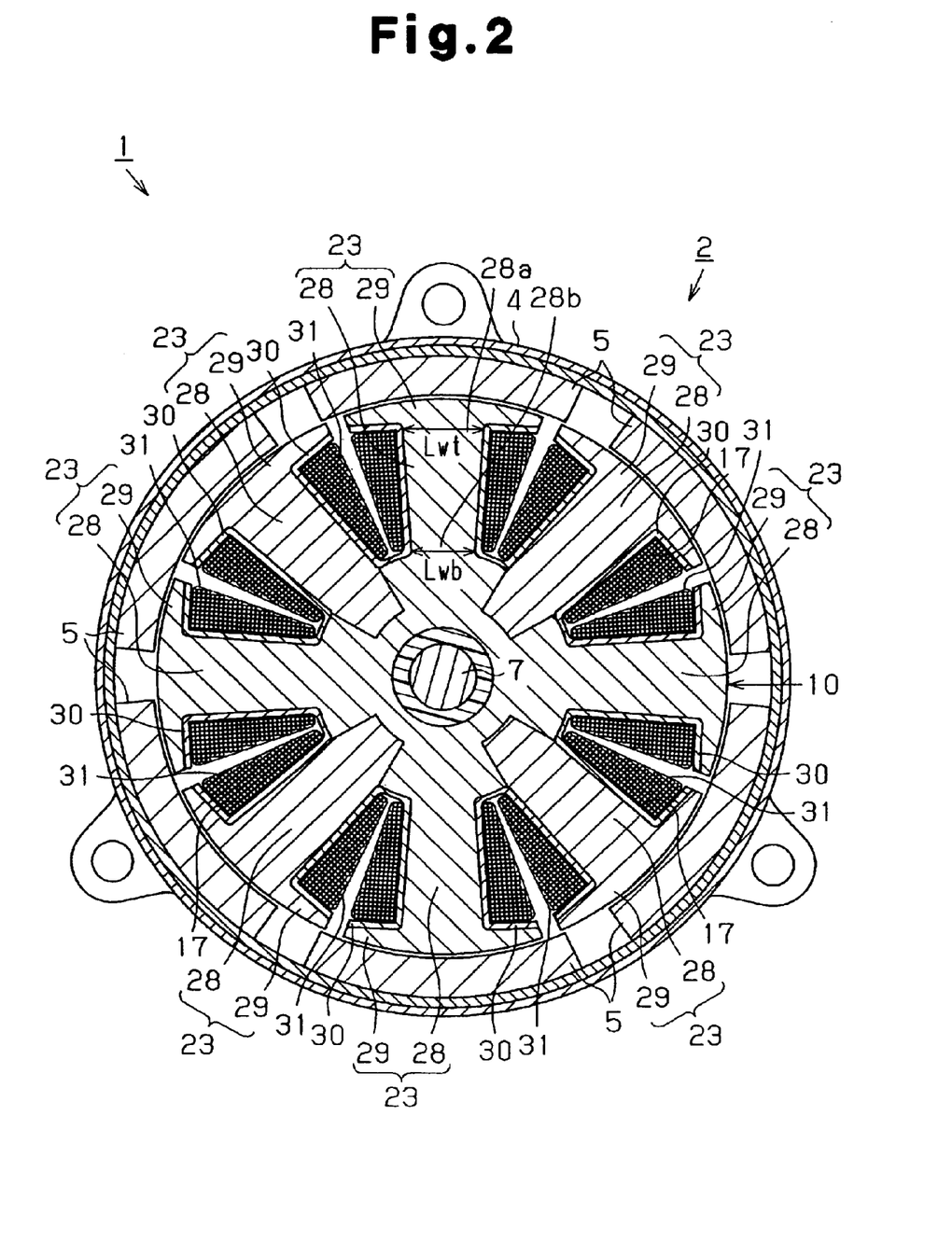
FIG. 2 is a cross-sectional view taken along line 2—2 of FIG. 1.

As shown in FIGS. 1 to 2, a direct-current motor 1 according to this embodiment has a stator 2 and an armature 3.

The stator 2 includes a yoke 4 and magnets 5 provided in the yoke 4. The magnets 5 function as magnetic poles. In this embodiment, the number of the magnets 5 is six, and the magnets 5 are fixed to the inner surface of the yoke 4 at equal angular intervals. The motor 1 has six poles. The yoke 4 is shaped as a cylinder with one end closed. An end frame 6 is provided at the open end of the yoke 4.

The armature 3 includes a rotary shaft 7, a rotor core 10, and a commutator 11. The rotor core 10 is fixed to an axial center portion of the rotary shaft 7. The commutator 11 is fixed to a portion of the rotary shaft 7 that is close to one end. The rotary shaft 7 is rotatably supported with a pair of bearings 15. One of the bearings 15 is provided at a center of the lid of the yoke 4, and the other bearing 15 is provided at a center of the end frame 6. The core 10 is located in the yoke 4 and surrounded by the magnets 5. In the axial direction of the rotary shaft 7, a side corresponding to the end frame 6 (rightward portion as viewed in FIG. 1) is referred to as the lower side, and a side opposite from the end frame 6 (leftward portion as viewed in FIG. 1) is referred to as the upper side.

The commutator 11 has a substantially cylindrical insulator 12. Segments 13, the number of which is twenty-four in this embodiment, are provided on the outer circumference of the commutator insulator 12. The commutator insulator 12 has short circuit members 14 for short circuiting the segments 13 to each other. Brushes 16 are provided in the yoke 4. The Brushes 16 slide on the segments 13.

In this embodiment, each short circuit member 14 short circuits three of the segments 13 so that the three segments 13 are at the same potential. The number of the segments 13 is twenty-four. Each segment 13 forms a group with two other segments 13 at intervals of seven other segments 13. The three segments 13 in each group are set at the same potential.

Figure 3:
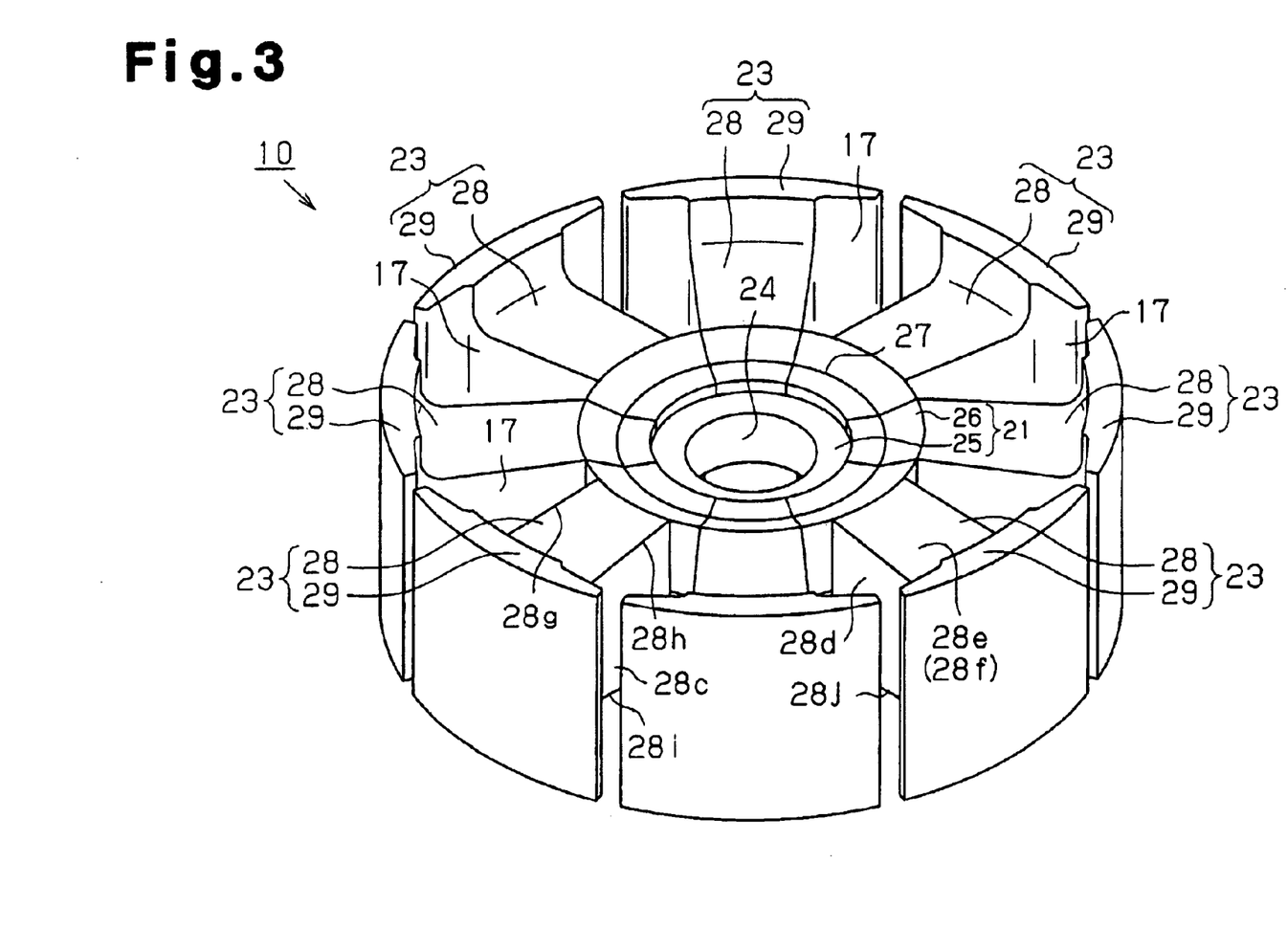
FIG. 3 is a perspective view showing the core of FIG. 1.

As shown in FIG. 3, the core 10 includes a ring body 21 and teeth 23. Each tooth 23 extends radially outward from the outer circumference of the ring body 21. In this embodiment, the number of the teeth 23 is eight, and the teeth 23 are provided at equal angular intervals. Therefore, eight slots 17 are created. Each slot 17 is defined between a pair of adjacent teeth 23. The ring body 21 includes an inner ring portion 25 having a center hole 24 and an outer ring portion 26 located about the inner ring portion 25. Each tooth 23 is located on the outer circumference of the outer ring portion 26.

The radially inward portion of the ring body 21 is dented in the axial direction relative to the radially outward portion. That is, recesses 27 are formed on the upper and lower surface of the ring body 21. The boundary between the inner ring portion 25 and the outer ring portion 26 is located inward of the recesses 27. The axial measurement of the inner ring portion 25 is less than the axial measurement of the outer ring portion 26. The measurement difference is within a range that ensures a cross-sectional area sufficient as a magnetic path.

As shown in FIGS. 1 to 3, each tooth 23 includes a coil winding section, which is a tooth body 28, and a wide section, which is a magnetism converging portion 29. A coil 31 is wound about the tooth body 28. The tooth body 28 extends radially outward from the outer circumference of the ring body 21. A tooth insulator 30 is attached to each tooth body 28. A coil 31 is wound about each tooth body 28 with the corresponding tooth insulator 30 in between.

Each coil 31 is formed of a wire 31a. Each tooth insulator 30 has two projections 30a provided at the radially outer end to fix the ends of the corresponding wire 31a. The projections 30a are located at the same side (at the lower side in this embodiment) with respect to the axial direction of the core 10. The ends of each wire 31a, which is wound about one of the tooth bodies 28, are drawn after being fixed to the projections 30a. The ends of the wire 31a are then connected to the corresponding segments 13 with one of the short circuit members 14.

The magnetism converging portion 29 is provided at the distal section of the tooth body 28 and is formed as a flange that extends in the circumferential and axial directions of the core 10. The measurement of each magnetism converging portion 29 with respect to the axial direction of the core 10 is substantially the same as the measurement of each magnet 5 in the yoke 4.

The measurement of each tooth body 28 with respect to the axial direction of the core 10 will be referred to as tooth height, and the measurement of each coil 31 with respect to the axial direction of the core 10 will be referred to as coil height. As shown in FIG. 1, the tooth height gradually increases from a distal section 28a of each tooth body 28 to a proximal section 28b. That is, a proximal tooth height Lhb, which is the tooth height of the proximal section 28b of each tooth body 28, is greater than a distal tooth height Lht, which is the tooth height of the distal section 28a.

The coil height has a maximum value (Lct) at a position near the distal section 28a of the tooth body 28, and gradually decreases from the maximum value Lct to a minimum value (Lcb) at the proximal section 28b.

A measurement of each tooth body 28 with respect to the circumferential direction of the core 10 will be referred to as tooth width. As shown in FIG. 2, the tooth width gradually decreases from the distal section 28a of each tooth body 28 to the proximal section 28b. That is, a proximal tooth width Lwb, which is the tooth width at the proximal section 28b of each tooth body 28, is smaller than a distal tooth width Lwt, which is the tooth width at the distal section 28a.

A cross-section of each tooth body 28 perpendicular to the extending direction (the direction from the distal section 28a toward the proximal section 28b) of the tooth body 28 will be referred to as magnetic flux passing cross-section. The area of the magnetic flux passing cross-section at the distal section 28a is substantially equal to the magnetic flux passing cross-section at the proximal section 28b. The magnetic flux passing cross-section of each tooth body 28 is rectangular, and each tooth body 28 substantially satisfies the following equation. (the distal tooth height Lht×the distal tooth width Lwt)=(the proximal tooth height Lhb×the proximal tooth width Lwb)

Each of the side surfaces 28c, 28d of each tooth body 28 is a trapezoid. The upper base of the trapezoid, which is the distal tooth height Lht, is shorter than the lower base, which is the proximal tooth height Lhb. Likewise, each of an upper side surface 28e and a lower side surface 28f of each tooth body 28 is a trapezoid. The upper base of the trapezoid, which is the proximal tooth width Lwb, is shorter than the lower base, which is the distal tooth width Lwt. In this embodiment, four sides 28g, 28h, 28i, and 28j that extend along the radial direction of each tooth body 28 are linear from the proximal section 28b to the distal section 28a.

Figure 4:
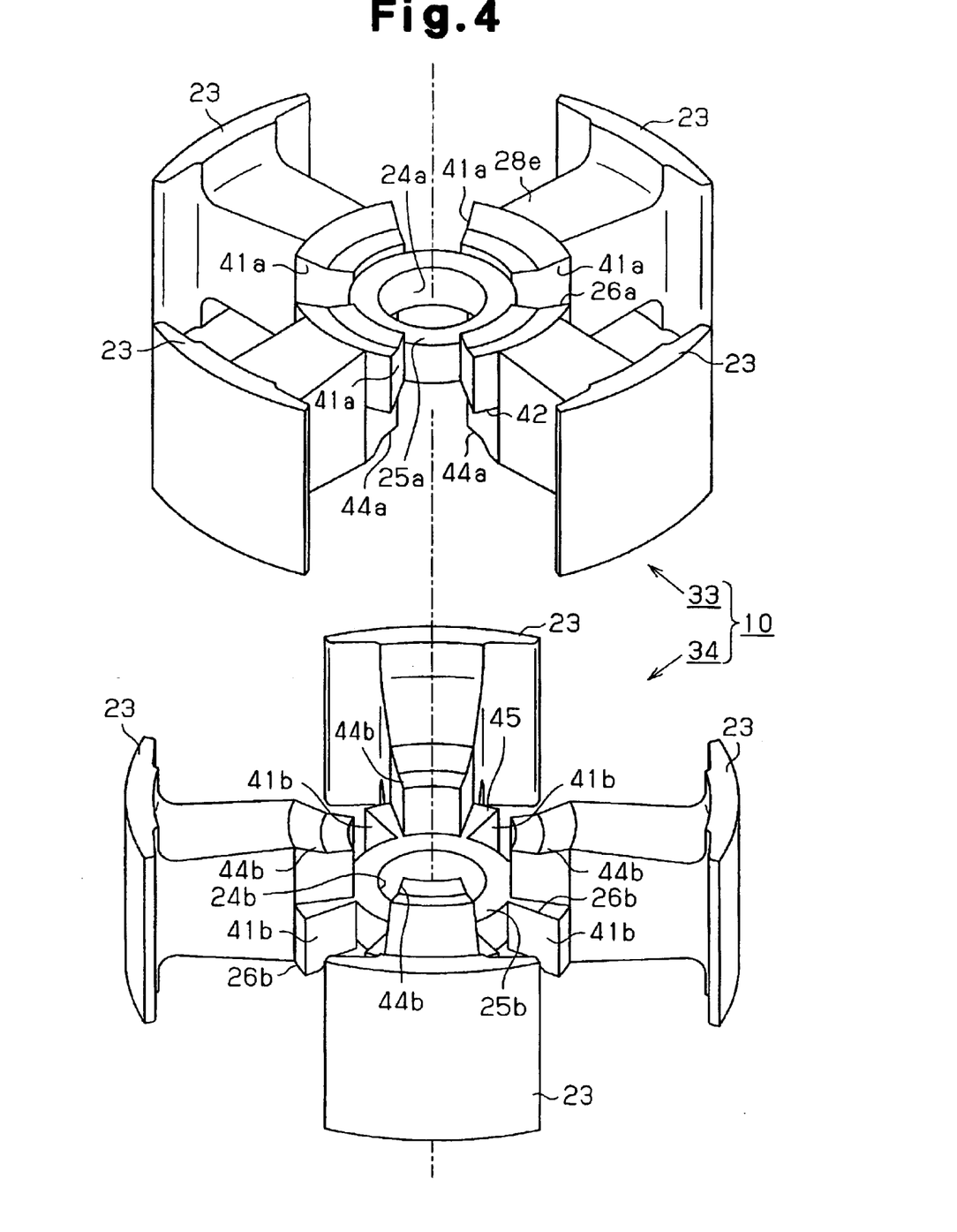
FIG. 4 is a perspective view showing the first core member and the second core member shown in FIG. 3.

As shown in FIG. 4, the core 10 is formed by assembling a first core member 33 and a second core member 34 with each other.

The first core member 33 includes a first inner ring portion 25a having a center hole 24a and a first outer ring portion 26a provided about the outer circumference of the first inner ring portion 25a. Four of the teeth 23 are provided on the outer circumference of the first outer ring portion 26a at equal angular intervals (90°). In this embodiment, the number of the teeth 23 provided on the first core member 33 is the half (four) of the total number (eight) of the teeth 23 of the core 10.

The axial measurement of the first outer ring portion 26a at the outer circumference is half the proximal tooth height Lhb. An upper surface 28e of each tooth body 28 is connected to the upper surface of the circumferential portion of the first outer ring portion 26a without a step. Therefore, the first inner ring portion 25a and the first outer ring portion 26a of the first core member 33 are displaced upward from the center of the teeth 23 with respect to the axial direction of the first core member 33.

The first outer ring portion 26a is divided into four sections by four notches 41a. Each notch 41a is located between each adjacent pair of the teeth 23 such that the notches 41a and the teeth 23 are alternately arranged at equal angular intervals (45°). The width of each notch 41a (the measurement with respect to the circumferential direction of the first core member 33) gradually decreases from the outer circumference toward the inner circumference of the first outer ring portion 26a. That is, each notch 41a is shaped like a wedge.

Four coupling projection 44a are provided on the lower surface 42 of the first outer ring portion 26a. Each coupling projection 44a extends from the outer edge to the inner edge of the lower surface 42 of the first outer ring portion 26a. The outer edge of each coupling projection 44a is connected to the proximal section 28b of the corresponding tooth body 28.

The measurement of each coupling projection 44a along the axial direction of the first core member 33 is half the proximal tooth height Lhb. The lower surface of each coupling projection 44a is connected to the lower surface of the corresponding tooth 23 without a step. Therefore, the coupling projections 44a of the first core member 33 are displaced downward from the center of the teeth 23 with respect to the axial direction of the first core member 33.

The width of each coupling projection 44a (the measurement with respect to the circumferential direction of the first core member 33) gradually decreases from the outer circumference toward the inner circumference of the first outer ring portion 26a. That is, each coupling projection 44a is shaped like a wedge.

The second core member 34 includes a second inner ring portion 25b having a center hole 24b and a second outer ring portion 26b provided about the outer circumference of the second inner ring portion 25b. Four of the teeth 23 are provided on the outer circumference of the second outer ring portion 26b at equal angular intervals (90°). In this embodiment, the number of the teeth 23 provided on the second core member 34 is the half (four) of the total number of the teeth 23 of the core 10.

The axial measurement of the second outer ring portion 26b at the outer circumference is half the proximal tooth height Lhb. A lower surface 28f of each tooth body 28 is connected to the lower surface of the circumferential portion of the second outer ring portion 26b without a step.

Therefore, the second inner ring portion 25b and the second outer ring portion 26b of the second core member 34 are displaced downward from the center of the teeth 23 with respect to the axial direction of the second core member 34.

The second outer ring portion 26b is divided into four sections by four notches 41b. Each notch 41b is located between each adjacent pair of the teeth 23 such that the notches 41b and the teeth 23 are alternately arranged at equal angular intervals (45°). The width of each notch 41b (the measurement with respect to the circumferential direction of the second core member 34) gradually decreases from the outer circumference toward the inner circumference of the second outer ring portion 26b. That is, each notch 41b is shaped like a wedge.

Four coupling projections 44b are provided on the upper surface 45 of the second outer ring portion 26b. Each coupling projection 44b extends from the outer edge to the inner edge of the upper surface 45 of the second outer ring portion 26b. The outer edge of each coupling projection 44b is connected to the proximal section 28b of the corresponding tooth body 28.

The measurement of each coupling projection 44a along the axial direction of the second core member 34 is half the proximal tooth height Lhb. The upper surface of each coupling projection 44b is connected to the upper surface of the corresponding tooth 28 without a step. Therefore, the coupling projections 44b of the second core member 34 are displaced upward from the center of the teeth 23 with respect to the axial direction of the second core member 34.

The width of each coupling projection 44b (the measurement with respect to the circumferential direction of the second core member 34) gradually decreases from the outer circumference toward the inner circumference of the second outer ring portion 26b. That is, each coupling projection 44b is shaped like a wedge.

That is, although the first core member 33 and the second core member 34 are placed upside down relative to each other, the structure of the first core member 33 is identical to that of the second core member 34. Further, the shape of each notch 41a of the first core member 33 corresponds to the shape of each coupling projection 44b of the second core member 34. Likewise, the shape of each notch 41b of the second core member 34 corresponds to the shape of each coupling projection 44a of the first core member 33.

Each of the first and second core members 33, 34 have the teeth 23 the number of which is half the total number of the teeth 23 of the core 10. Thus, when the first core member 33 and the second core member 34 are engaged with each other, the core 10 having the eight teeth 23 is obtained.

In this embodiment, each of the first core member 33 and the second core member 34 is formed by compressing magnetic powder such that the first inner ring portion 25a (the second inner ring portion 25b), the first outer ring portion 26a (the second outer ring portion 26b), and the four teeth 23 are integrated.

Figure 5:
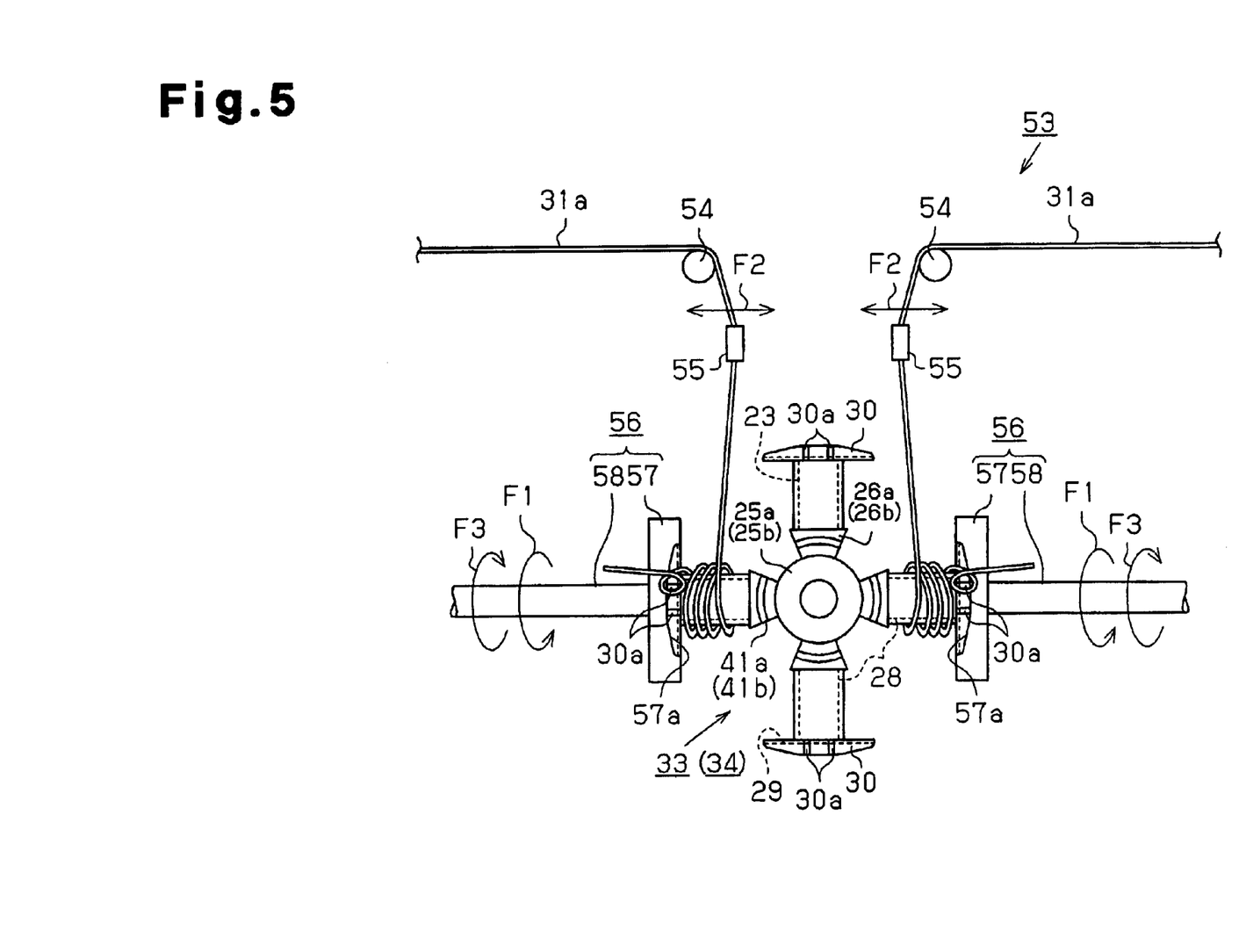
FIG. 5 is a diagrammatic view showing a coil winding apparatus.

FIG. 5 shows a coil winding apparatus 53 for winding the wires 31a of the coils 31 to the teeth 23. The coil winding apparatus 53 includes two wire feeders (not shown), two pulleys 54, two guiding members 55, and two jigs 56. The wire 31a, which is drawn from each wire feeder, is fed to the first core portion 33 (the second core member 34), which is supported by the jigs 56, via the corresponding pulley 54 and the corresponding guiding member 55.

Each jig 56 is located downstream of the corresponding guiding member 55 along the feeding direction of the corresponding wire 31a. Each jig 56 includes a teeth holder 57 and a rotary shaft 58. A holding recess 57a is formed in each teeth holder 57. The holding recess 57a is shaped to correspond to the magnetism converging portion 29.

The teeth holders 57 hold two of the teeth 23 that are spaced by 180° in the first core member 33 (the second core member 34). Thus, the first core member 33 (the second core member 34) is held by two jigs 56. The holding recesses 57a of the jigs 56 face each other, and the first core member 33 (the second core member 34) is held between the jigs 56.

The rotary shaft 58 of each teeth holder 57 extends in a direction away from the holding recess 57a. Each rotary shaft 58 is coupled to the rotary shaft of a drive motor (not shown). The jigs 56 are rotated in the same direction (direction indicated by arrows F1 in FIG. 5) by the drive motors. When the jigs 56 are rotated, the first core member 33 (the second core member 34) is rotated. Accordingly, the wires 31a are simultaneously wound (in a concentrated manner) about the two of the teeth 23 held by the teeth holder 57.

Each guiding member 55 is located downstream of the corresponding pulley 54 along the feeding direction of the corresponding wire 31a. Each guiding member 55 guides the wire 31a that is fed from the corresponding wire feeder. Each guiding member 55 is moved along the axial direction of the corresponding rotary shaft 58 (direction indicated by arrows F2 in FIG. 5).

The coil winding apparatus 53 winds the wires 31a about the teeth 28. The apparatus 53 also fixes the wire 31a to the projections 30a prior to and after winding the wire 31a to the tooth body 28. During winding of the wire 31a, each guiding member 55 guides the wire 31a between the proximal section 28b and the distal section 28a of the tooth body 28 about which the wire 31a is wound.

When the wire 31a is fixed, each guiding member 55 guides the wire 31a to the projections 30a of the tooth insulator 30.

A method for manufacturing the armature 3 with the coil winding apparatus 53 will hereafter be described.

First, the tooth insulator 30 is attached to each tooth 23 of the first core member 33 and the second core member 34. The projections 30a of the tooth insulator 30 attached to the first core member 33 are located at a side (the lower side) of the first core member 33 where the coupling projections 44a are provided. The projections 30a of the tooth insulator 30 attached to the second core member 34 are located at a side opposite from the side (the upper side) where the coupling projections 44b are provided. Then, the jigs 56 hold two of the teeth 23 that are on a line perpendicular to the axis of the first core member 33.

During winding of the wire 31a by the coil winding apparatus 53, the wires 31a that are drawn from the wire feeders are sent to the first core member 33 through the pulleys 54 and the guiding members 55. Rotation of the jigs 56 causes the wires 31a to be wound about the two teeth 23 held by the jigs 56. Since the space between each adjacent pair of the teeth 23 of the first core member 33 is wide (the teeth 23 are spaced by 90°), the wires 31a drawn from the wire feeders are prevented from contacting the magnetism converging portions 29 of the teeth 23 about which the wires 31a are not wound.

When winding of the wires 31a about the two teeth 23 is completed, the coil winding apparatus 53 performs fixing of the wires 31a. At this time, the wires 31a are guided to the projections 30a by the guiding members 55, and the jigs 56 are rotated in a direction opposite from the direction when winding of the wires 31a (in a direction indicated by arrows F3). This fixes each wire 31a to the corresponding projection 30a. Fixing of the wire 31a prior to the winding is performed in the same manner as the fixing of the wire 31a after the winding.

After cutting the wire 31a to be a predetermined length, two of the teeth 23 about which the wires 31 have not been wound are held by the teeth holders 57. Then, winding and fixing of the wires 31a are performed. Accordingly, winding of the wires 31a to the first core member 33 is completed. The winding and fixing of the wires 31a are performed to the second core member 34. In this manner, the core members 33, 34 each having the four coils 31 are obtained.

Next, the axes of the first core member 33 and the second core member 34 are aligned such that the first inner ring portion 25a of the first core member 33 and the second inner ring portion 25b of the second core member 34 overlap each other. Then, the first core member 33 and the second core member 34 are assembled to each other such that the teeth 23 of the first core member 33 and the teeth 23 of the second core member 34 are displaced by 45°. Accordingly, the core 10 is formed.

Specifically, each coupling projection 44a of the first core member 33 is fitted in one of the notches 41b of the second core member 34, and each coupling projection 44b of the second core member 34 is fitted in one of the notches 41a of the first core member 33. Accordingly, the first core member 33 is coupled to the second core member 34.

The first inner ring portion 25a and the second inner ring portion 25b form the inner ring portion 25 of the ring body 21. The first outer ring portion 26a, the second outer ring portion 26b, the coupling projections 44a, and the coupling projections 44b form the outer ring portion 26. The inner ring portion 25 and the outer ring portion 26 form the ring body 21. The teeth 23 are located on the outer circumference of the ring body 21 with equal angular intervals (45°)

Thereafter, the core 10 and the commutator 11 are fixed to the rotary shaft 7, and the ends of each wire 31a are connected to the corresponding short circuit member 14. Each short circuit member 14 is connected to the corresponding segments 13 of the commutator 11. The armature 3 is thus completed.

The relationship between the shape and the area of the magnetic flux passing cross-section of each tooth body 28 will now be described.

Figure 6:
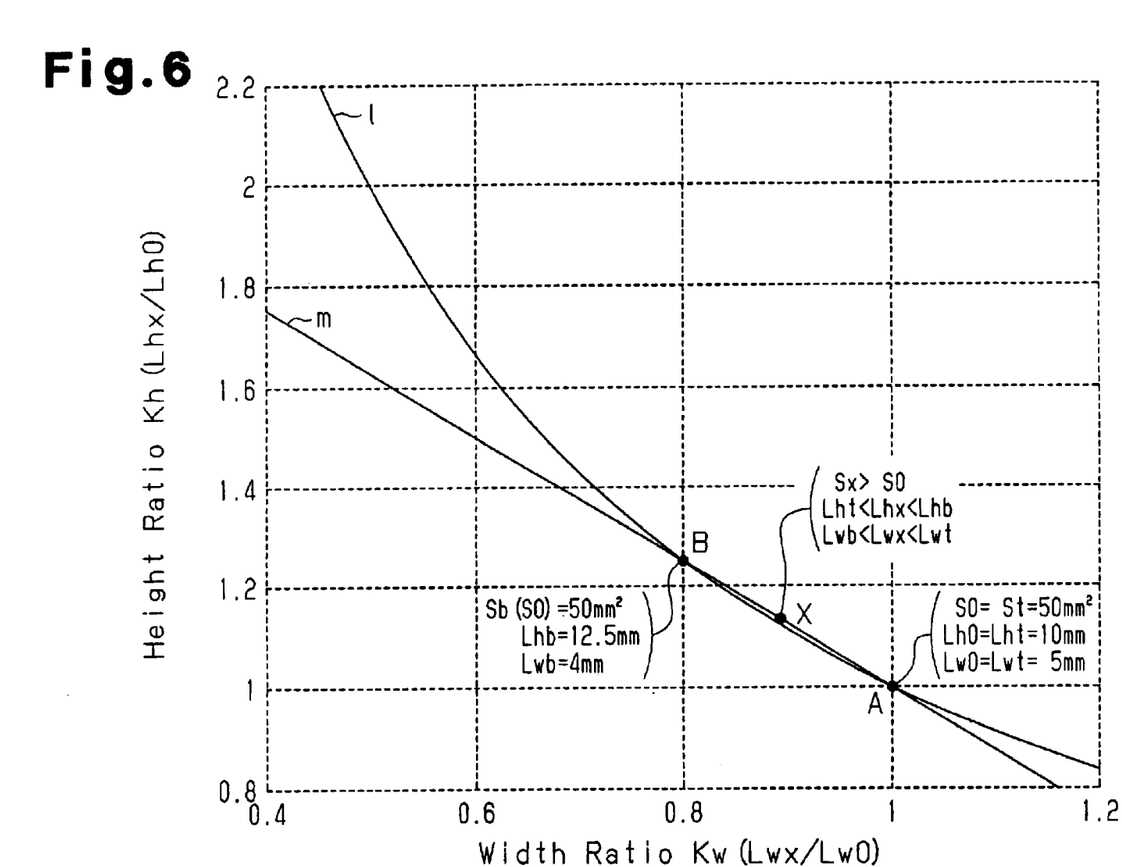
FIG. 6 is a graph showing the relationship between the height ratio and the width ratio of the tooth bodies shown in FIG. 1.

FIG. 6 is a graph showing the relationship between a height ratio Kh and a width ratio Kw. In the graph, Lhx represents the tooth height (actual tooth height) of each tooth body 28 at a given section between the distal section 28a and the proximal section 28b. The height ratio Kh represents the ratio of the tooth height Lhx to a reference tooth height Lh0. Lwx represents the tooth width (actual tooth width) at a given section between the distal section 28a and the proximal section 28b. The width ratio Kw represents the ratio of the tooth width Lwx to a reference tooth width Lw0.

In this embodiment, the four sides 28g to 28j of each tooth body 28 are linear from the proximal section 28b to the distal section 28a of the tooth body 28. Therefore, the actual tooth height Lhx and the actual tooth width Lwx linearly changes from the distal section 28a to the proximal section 28b. The relationship between the height ratio Kh and the width ratio Kw satisfies the following equation;

$$Kh = -\alpha(Kw-1)+1$$

in which α is an arbitrary coefficient.

On the other hand, if an equation (the reference tooth height Lh0×the reference tooth width Lw0)=(the actual tooth height Lhx×the actual tooth width Lwx) is satisfied at an given section between the distal section 28a and the proximal section 28b of each tooth body 28, that is, if the area of magnetic flux passing cross-section is constant at a given section between the distal section 28a and the proximal section 28b, an equation Kh=1/Kw is satisfied, and the sides 28g to 28j of the tooth body 28 are curved.

For example, suppose that a reference cross-sectional area S0 and the area St of the magnetic flux passing cross-section at the distal section 28a are both 50 mm (S0=St=50 mm), the reference tooth height Lh0 and the distal tooth height Lht are both 10 mm (Lh0=Lht=10 mm), and the reference tooth width Lw0 and the distal tooth width Lwt are both 5 mm (Lw0=Lwt=5 mm).

Also, suppose that the area Sb of the magnetic flux passing cross-section at the proximal section 28b is 50 mm, which is equal to the area St of the magnetic flux passing cross-section at the distal section 28a, the proximal tooth height Lhb is 12.5 mm (Kh=1.25), and the proximal tooth width Lwb is 4 mm (Kw=0.8).

If the area of a given magnetic flux passing cross-section between the proximal section 28b and the distal section 28a of the tooth body 28 is constant, the combination of Kw and Kh (Kw, Kh) at the given magnetic flux passing cross-section is plotted on a curve 1 of an inverse proportion (Kh=1/Kw) that passes through a point A (1, 1) and a point B (0.8, 1.25) on the graph of FIG. 6.

The area of the magnetic flux passing cross-section at a given section between the distal section 28a and the proximal section 28b of the tooth body 28 is represented by an actual cross-sectional area Sx. If the actual cross-sectional area Sx is greater than the reference cross-sectional area S0, the point (Kw, Kh) is plotted above the curve 1. If the actual cross-sectional area Sx is smaller than the reference cross-sectional area S0, the point (Kw, Kh) is plotted below the curve 1.

In this embodiment, the four sides 28g to 28j of each tooth body 28 linearly extend from the proximal section 28b to the distal section 28a of the tooth body 28. Therefore, a point (Kw, Kh) at a given magnetic flux passing cross-section between the proximal section 28b and the distal section 28a is plotted on a straight line m passing through the point A and the point B on the graph of FIG. 6. As shown in FIG. 6, the straight line m is above the curve 1 in a range of 0.8<Kw<1.0.

The area St of the magnetic flux passing cross-section at the distal section 28a (which is equal to the area Sb of the magnetic flux passing cross-section at the proximal section 28b) is set as the reference cross-section S0. The four sides 28g to 28j of each tooth body 28 are linear from the proximal section 28b to the distal section 28a of the tooth body 28. Accordingly, the actual cross-sectional area Sx of the flux passing cross-section at a given section between the distal section 28a and the proximal section 28b of the tooth body 28 (point X in the graph) is greater than the reference cross-sectional area S0, or the area St of the flux passing through cross-section at the distal section 28a. Therefore, effective flux is not reduced at a given section between the distal section 28a and the proximal section 28b of the tooth body 28.

The above embodiment has the following advantages.

(1) Each tooth 23 of the core 10 includes the tooth body 28, about which the coil 31 is wound, and the magnetism converging portion 29 provided at the distal end of the tooth body 28. The tooth width of each tooth body 28 gradually decreases from the distal section 28a toward the proximal section 28b.

Accordingly, the space of each slot 17 between an adjacent pair of the teeth 23 (the space between the teeth 23) widens toward the radially inner end. Therefore, the amount of the coil 31 accommodated in the slot 17 is increased.

In a radially outer portion of each slot 17, a center portion with respect to the circumferential direction of the core 10 is a portion that is farthest from the adjacent teeth 28 and therefore cannot be used for accommodating the coil 31. However, in the above embodiment, since the tooth width is great at the distal section 28a, it is easy to accommodate the coil 31 in that space. Accordingly, the coil accommodation efficiency of the slots 17 is improved.

The tooth height of each tooth 28 gradually increases from the distal section 28a to the proximal section 28b. Therefore, since the tooth height of each tooth body 28 decreases toward the distal section 28a, the coil height is suppressed without decreasing the number of winding of the coil 31. As a result, the size of the direct-current motor 1 is reduced.

Further, although the tooth width gradually decreases from the distal section 28a to the proximal section 28b, the tooth height increases. Thus, a necessary area of the flux passing cross-section is maintained. That is, since the coil accommodation efficiency of the slots 17 is high, a sufficient space for accommodating the coil 31 exists in each slot 17 even if the magnetic path (the cross-sectional area of the tooth body 28) is increased to suppress loss of the effective magnetic flux. Thus, the amount of flux can be increased by using strong magnets 5 to increase the torque generated by the direct-current motor 1.

Further, the core 10 is formed by assembling the first and second core members 33, 34 each having the teeth 23 of a number that is half the total number of the teeth 23 of the core 10. The tooth height of each tooth 28 gradually increases from the distal section 28a to the proximal section 28b. Therefore, the tooth height of the proximal section 28b, which receives load due to assembling, is readily increased to improve the durability of the teeth 23 against the assembling load applied when assembling the first core member 33 with the second core member 34. Thus, deformation and cracking of the teeth 23 due to assembly of the first core member 33 and the second core member 34 are prevented.

(2) In this embodiment, the coil 31 is wound about each tooth 23 of the first and second core members 33, 34 prior to assembly of the core members 33, 34. Thereafter, the first core member 33 and the second core member 34 are assembled to form the core 10.

Prior to the assembly, the first core member 33 is separated from the second core member 34, and the space between each adjacent pair of the teeth 23 is wide (the teeth 23 are spaced by 90°). There is thus little restriction to winding of the coil 31. This increases the efficiency of winding of the coil 31 and, as a result, increases the coil space factor.

(3) The teeth 28 are formed such that the area of the flux passing cross-section at the distal section 28a of each tooth body 28 is substantially equal to the area of the flux passing cross-section at the proximal section 28b, or such that the equation (the distal tooth height Lht×the distal tooth width Lwt)=(the proximal tooth height Lhb×the proximal tooth width Lwb) is substantially satisfied. Thus, the effective flux at the distal section 28a and the proximal section 28b of each tooth body 28 is prevented from decreasing. As a result, the torque generated by the direct-current motor 1 is increased.

(4) The four sides 28g to 28j of each tooth 28 linearly extend from the proximal section 28b to the distal section 28a. This simplifies the shape of each tooth body 28, and thus facilitates the forming of the core 10.

Further, if the area of the flux passing cross-section at at least one of the distal section 28a and the proximal section 28b is set as the minimum cross-sectional area (reference cross-sectional area), the area of the flux passing cross-section at a given section between the distal section 28a and the proximal section 28b of each tooth 28 is greater than the reference cross-sectional area. Therefore, the effective flux at a given section of the tooth body 28 is prevented from decreasing. As a result, the torque generated by the direct-current motor 1 is increased.

(5) The measurement of the magnetism converging portion 29 of each tooth 23 with respect to the axial direction of the core 10 is substantially the same as the measurement of each magnet 5 in the yoke 4. Therefore, the flux of each magnet 5 flows into the magnetism converging portion 29 at positions relatively close to the magnet 5. As a result, the torque generated by the direct-current motor 1 is increased.

(6) The recesses 27 are formed on the upper and lower surface of the ring body 21.

Therefore, an axial end of the commutator 11 and an axial end of the bearing 15 toward the recesses 27 are accommodated in the recesses 27. Accordingly, the axial size of the armature 3 is reduced. As a result, the axial size of the direct-current motor 1 is reduced.

(7) As the jigs 56 rotate, the first core member 33 (the second core member 34) rotates, and the wires 31a are wound about the teeth 23. Therefore, compared to a case in which a nozzle is rotated to wind the wire 31a about each tooth 23, the wire 31a is not wound with complicated actions. Thus, the winding speed of the wire 31a is readily increased. This improves the productivity of the direct-current motor 1.

Also, since no space for inserting a nozzle is required in each slot 17, only the space required for the coil 31 needs to be created in each slot 17. As a result, space that is conventionally incapable of accommodating a coil is used to accommodate the coil 31. This increases the space factor of the wire 31a, and, in turn, increases the space factor of the direct-current motor 1.

(8) Two of the teeth 23 are each held by the jig 56.

Thus, compared to a case where only one of the teeth 23 is held by the jig 56, the core members 33, 34 are steadily rotated. Also, since two of the teeth 23 that are angularly spaced by 180° are held by the jigs 56, it is possible to draw the wires 31a in direction perpendicular to the direction along which the teeth 23 extend. This facilitates the wires 31a to be wound about each tooth 23 in a uniform thickness. Thus, since the wires 31a are stably wound, the productivity of the direct-current motor 1 is further improved.

(9) The guiding members 55 are moved along the extending direction of the teeth 23 about which the wires 31a are being wound (the direction indicated by arrows F2), thereby guiding the wires 31a drawn from the wire feeders. Therefore, by moving the guiding members 55 while the jigs 56 are rotated, the wires 31a are properly aligned and wound about the teeth 23 at a uniform thickness. This improves the space factor of the coils 31.

(10) When the jigs 56 are rotated, the first core member 33 (the second core member 34) is rotated. Accordingly, the wires 31a are simultaneously wound (in a concentrated manner) about two of the teeth 23 held by the teeth holders 57. Therefore, compared to a case where the wire 31a is consecutively wound about one of the teeth 23 at a time, the speed at which the wires 31a are wound about the teeth 23 of the first core member 33 (the second core member 34) is doubled. Therefore, the productivity of the direct-current motor 1 is further improved.

(11) The coil winding apparatus 53 not only winds the wires 31a about the teeth 23, but also fixes the wires 31a to the projections 30a (wire fixing). Therefore, unlike a case where the coil winding and the wire fixing are performed by separate apparatuses, apparatuses need not be replaced between the coil winding and the wire fixing. That is, the coil winding and the wire fixing are continuously performed. This further improves the productivity of the direct-current motor 1.

(12) Before the core 10 is assembled, that is, when the first core member 33 and the second core member 34 are still separated, the magnetism converging portion 29 does not exist in a range from the proximal section 28b to the distal section 28a of each tooth body 28 of the cores 33, 34 with respect to a direction perpendicular to the extending direction of the tooth body 28.

Thus, the wires 31a drawn from the wire feeders do not contact the magnetism converging portions 29 of the teeth 23 about which the wires 31a are not being wound. Therefore, since restrictions during winding of the wires 31a are reduced, the productivity of the direct-current motor 1 is further improved.

(13) The projections 30a of the tooth insulator 30 attached to the first core member 33 are provided on the side (the lower side) where the coupling projections 44a are provided. The projections 30a of the tooth insulator 30 attached to the second core member 34 are provided on the side opposite from the side (the upper side) where the coupling projections 44b are provided.

Therefore, when the first core member 33 and the second core member 34 are assembled, the ends of the wires 31a of the coils 31 of the first core member 33 and the ends of the wires 31a of the coils 31 of the second core member 34 are drawn from the same side (the lower side) with respect to the axial direction of the core 10. This facilitates connection of the wires 31a to the commutator 11.

(14) The six magnets 5 are provided on the inner circumference of the yoke 4 at equal angular intervals. The eight teeth 23 are provided on the core 10 at equal angular intervals. The eight slots 17 are defined among the teeth 23. The twenty-four segments 13 are provided on the outer circumference of the commutator insulator 12 of the commutator 11. That is, the direct-current motor 1 has six poles, eight slots, and twenty-four segments.

Therefore, torque vectors of each pair of the slots 17 that are symmetric with respect to the axis of the core 10 counteract each other, which suppresses vibration of the armature 3 functioning as a rotor. As a result, the direct-current motor 1 with small vibrations is obtained.

(15) The core members 33, 34 are formed by compressing magnetic powder. Therefore, although each tooth 23 has a complicated shape in which the magnetism converging portion 29 extends from the distal section 28a of the tooth body 28 in the axial direction of the core 10, the teeth 23 having such a complicated shape are readily formed compared to a case where the core members 33, 34 are formed by laminating metal plates.

It should be apparent to those skilled in the art that the present invention may be embodied in many other specific forms without departing from the spirit or scope of the invention. Particularly, it should be understood that the invention may be embodied in the following forms.

Figure 7:
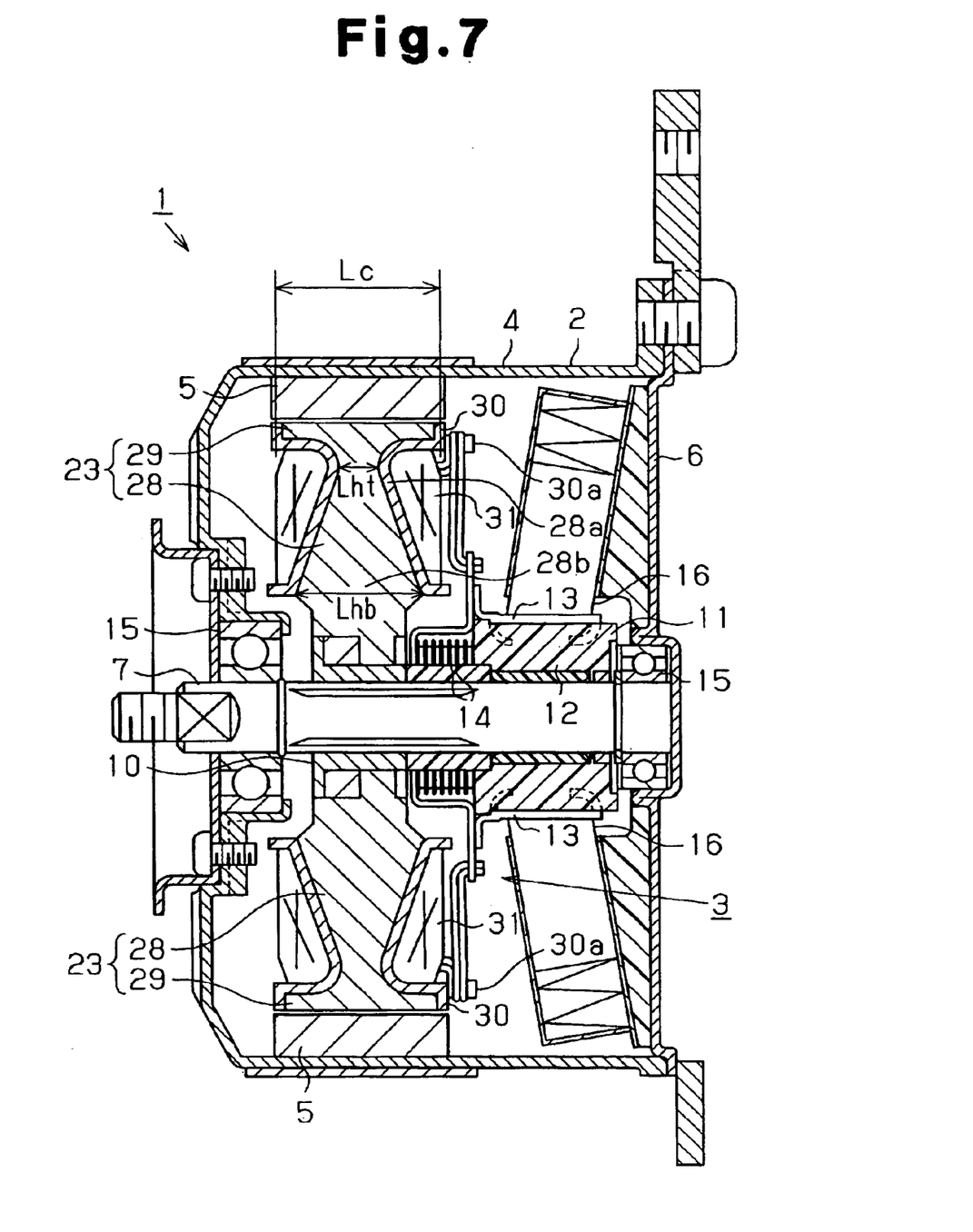
FIG. 7 is a side cross-sectional view illustrating a direct-current motor according to another embodiment.

As shown in FIG. 7, the ratio between the distal tooth height Lht and the proximal tooth height Lhb (the ratio between the distal tooth width Lwt and the proximal tooth width Lwb) of each tooth body 28 may be changed such that the coil height Lc of the coil 31 wound about the tooth body 28 is constant from the distal section 28a to the proximal section 28b of the tooth body 28.

That is, the teeth 28 may be formed such that the upper surface and the lower surface of the coils 31 are substantially parallel. This configuration further improves the space factor of the coils 31. As a result, the size of the direct-current motor 1 is further reduced.

In the above embodiments, the area of the flux passing cross-section at the distal section 28a of each tooth body 28 is substantially equal to that of the proximal section 28b, and the four sides 28g to 28j of each tooth body 28 linearly extend from the proximal section 28b to the distal section 28a. However, as indicated by curve 1 for comparison in the graph FIG. 6, the sides 28g to 28j may be changed such that the area of the flux passing cross-section is constant in a given section between the proximal section 28b and the distal section 28a of the tooth body 28.

Figure 8:
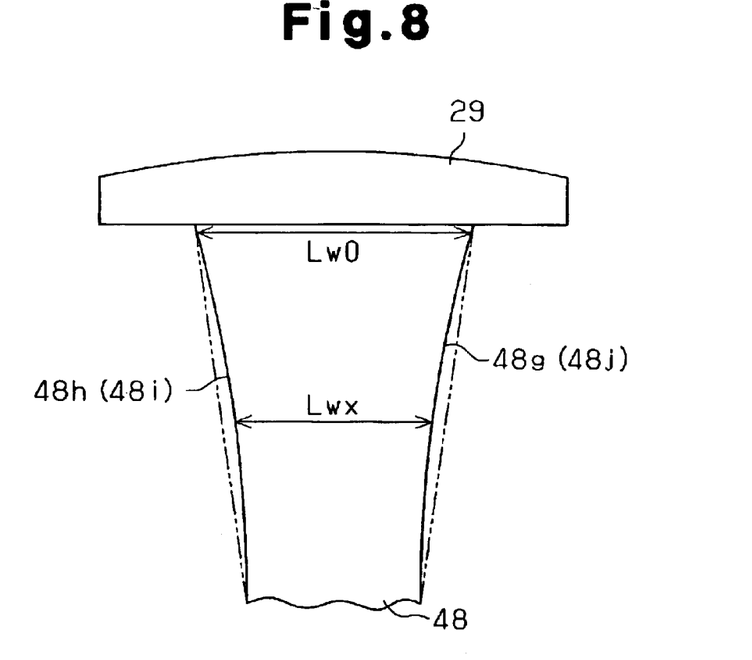
FIG. 8 is a plan view illustrating a tooth of a motor according to another embodiment.
Figure 9:
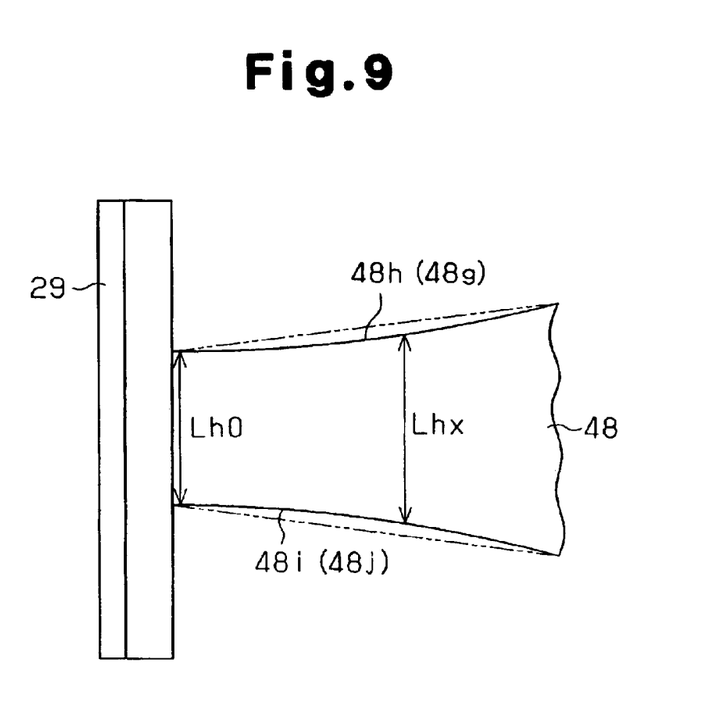
FIG. 9 is a side view illustrating the tooth of the motor according to the embodiment of FIG. 8.

That is, as shown in FIGS. 8 and 9, the sides 48g to 48j may be curved inward as shown in FIGS. 8 and 9 such that an equation (the reference tooth height Lh0×the reference tooth width Lw0)=(the actual tooth height Lhx×the actual tooth width Lwx) is satisfied at the flux passing cross-section at a given section in the extending direction of each tooth body 48.

This configuration optimizes the size of each tooth body 48 in relation to the effective flux. Accordingly, the size of each tooth 48 is reduced while maintaining the effective flux at the given section in the extending direction of the tooth 48. Further, compared to the case where the four sides 48g to 48j are linear, the space for winding the coil 31 (the slot 17) is enlarged by curving the sides 48g to 48j inward. Thus, a greater amount of the coil 31 can be wound about the tooth body 48. Also, the coil height of the coils 31 is reduced.

In the above embodiments, two of the teeth 23 that are angularly spaced by 180° are each held by the jig 56. However, only one of the teeth 23 may be held by the jig 56.

In the above embodiments, the wires 31a are simultaneously wound about two of the teeth 23 of the first core member 33 (the second core member 34). However, the wires 31a may be consecutively wound about one of the teeth 23 at a time.

Figure 10:
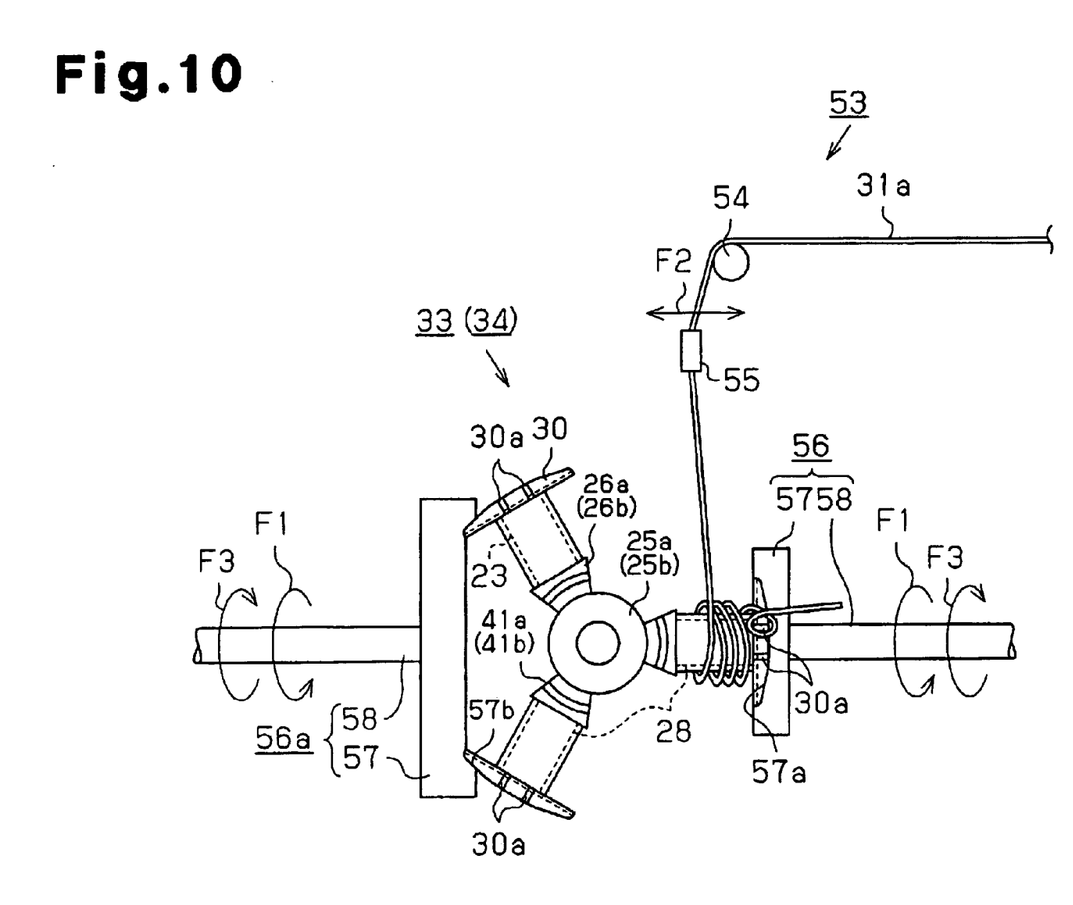
FIG. 10 is a diagrammatic view showing a coil winding apparatus according to another embodiment.

If each of the first and second core members 33, 34 has an odd-number (for example, three) of the teeth 23 as shown in FIG. 10, the shape of one of the two jigs 56 may be changed.

In this case, a jig 56a having a holding recess 57b is prepared. The jig 56a holds adjacent ends of a pair of adjacent magnetism converging portions 29. The two jigs 56, 56a hold the three teeth 23 to hold the first core member 33 (the second core member 34). The wire 31a is wound about the tooth 23 held by the jig 56.

In the above embodiments, the guiding members 55 need not be moved. Further, the guiding members 55 may be omitted.

In the above embodiments, the projections 30a of the tooth insulator 30 attached to the second core member 34 are located at a side opposite from the side where the coupling projections 44b are located. However, the projections 30a may be provided elsewhere. In this case, the ends of the wires 31a wound about the teeth 28 of the first core member 33 may be drawn in the opposite direction from the ends of the wires 31a wound about the teeth 28 of the second core member 34 with respect to the axial direction of the core 10.

In the above embodiments, the number of the teeth 23, the number of the magnets 5, and the number of the segments 13 are eight, six, and twenty-four, respectively. However, these numbers may be changed. That is, the direct-current motor 1 may have a configuration other than the configuration of six-pole, eight-slot, and twenty-segments.

In the above embodiments, the first core member 33 and the second core member 34 are formed by compressing magnetic powder. However, the core members 33, 34 may be formed by laminating metal plates.

In the illustrated embodiments, the core 10 is formed by assembling the two core members 33, 34. However, the core 10 may be formed by assembling more than two core members. In this case, each core member has teeth the number of which is determined by dividing the total number of the teeth 23 of the core 10 by the number of the core members, and the teeth 23 on each core member are spaced by equal angular intervals.

In the above embodiments, the present invention is applied to the rotor core of the direct-current motor with brushes. However, the present invention may be applied to other types of motors such as a brushless direct-current motor.

Therefore, the present examples and embodiments are to be considered as illustrative and not restrictive and the invention is not to be limited to the details given herein, but may be modified within the scope and equivalence of the appended claims.

What is claimed is:

1. A method for winding coils on a rotor core, wherein the rotor core includes a ring body and a plurality of teeth extending radially outward from an outer circumference of the ring body, wherein each tooth includes a coil winding portion about which a coil is wound, wherein the coil winding portion includes a proximal section and a distal section, the proximal section being coupled to the ring body, and the distal section being located radially outward of the proximal section, wherein a magnetism converging section is provided at the distal section of the coil winding portion, the winding method comprising:

preparing a plurality of core members which are assembled to form the rotor core, wherein each core member has a plurality of teeth the number of which is obtained by dividing the total number of the teeth of the rotor core by the number of the core members, and wherein the teeth of each core member are spaced at equal angular intervals;

holding with a plurality of jigs one of the core members prior to assembly at the teeth of the core member, wherein said plurality of jigs include at least a first jig and a second jig, wherein the first and second jigs are arranged on opposite sides of the core member and each holds different teeth; and rotating the core member held by the jigs about a rotation axis along the extending direction of at least one of the teeth, thereby winding the wire forming the coil about the one tooth.

2. The method for winding coils on the rotor core according to claim 1, wherein each core member includes two teeth located on the rotation axis, and wherein the core member is rotated while each of the two teeth is held by the corresponding jig.

3. The method for winding coils on the rotor core according to claim 1, wherein, during rotation of the core member, a guiding member, which guides the wire supplied from a wire feeder to the coil winding portion, is reciprocated along the extending direction of the tooth about which the wire is wound.

4. The method for winding coils on the rotor core according to claim 1, wherein each core member includes two teeth located on the rotation axis, and wherein the corresponding wires are simultaneously wound about the two teeth, respectively.

5. A method for winding coils on the rotor core according to claim 1, further comprising steps of: fixing the wire to the projection provided on the tooth prior to winding of the wire about the tooth; and fixing a portion of the wire extending from the tooth to the projection after winding the wire, and cutting the extending portion of the wire.

6. The method for winding coils on the rotor core according to claim 1, wherein the number of the teeth of each core member is odd, and wherein the number of the teeth held by the first jig and the number of the teeth held by the second jig are different from each other.

7. The method for winding coils on the rotor core according to claim 6, wherein each core member includes at least three teeth, wherein the first jig holds at least one of the three teeth, and the second jig holds the remaining two teeth, and wherein the first and second jigs hold the core member such that the tooth held by the first jig is located on the rotation axis.

* * * * *